United States Patent [19]
Cohen

[11] Patent Number: 5,756,609
[45] Date of Patent: May 26, 1998

[54] HOMOGENEOUS METALLOCENE-BASED OLEFIN POLYMERIZATION SYSTEM WITH INCREASED ACTIVITY

[75] Inventor: Steven A. Cohen, Alpharetta, Ga.

[73] Assignee: Amoco Corporation, Chicago, Ill.

[21] Appl. No.: 733,666

[22] Filed: Oct. 17, 1996

Related U.S. Application Data

[60] Provisional application No. 60/005,598, Oct. 19, 1995.
[51] Int. Cl.$^6$ .............................. C08F 4/642; C08F 10/06
[52] U.S. Cl. .......................... 526/127; 526/132; 526/133; 526/151; 526/153; 526/160; 526/351; 526/904; 526/943; 502/108; 502/117; 502/118; 502/124; 502/128; 502/129; 502/132; 502/153
[58] Field of Search .................................. 526/133, 160, 526/943, 904, 132, 127, 151, 153; 502/132, 108, 117, 118, 128, 124, 153, 129, 133

[56] References Cited

U.S. PATENT DOCUMENTS

| | | | |
|---|---|---|---|
| 5,434,115 | 7/1995 | Yamada et al. | 526/133 X |
| 5,489,659 | 2/1996 | Sugano et al. | 526/133 X |

FOREIGN PATENT DOCUMENTS

| | | | |
|---|---|---|---|
| 0500944 | 9/1992 | European Pat. Off. | |
| 0504418 | 9/1992 | European Pat. Off. | 526/170 |
| 0612768 | 8/1994 | European Pat. Off. | |
| 0709405 | 5/1996 | European Pat. Off. | |

*Primary Examiner*—Fred Teskin
*Attorney, Agent, or Firm*—Wallace L. Oliver

[57] ABSTRACT

An olefin homogeneous polymerization catalyst demonstrating increased activity is formed from a cyclopentadienyl metallocene component, a salt of a compatible cation and a non-coordinating anion, and a $C_3$–$C_6$ trialkylaluminum, preferably triisobutylaluminum. A homogeneous polymerization process comprises controlling polymerization activity with such catalyst by controlling the aluminum/metal (Al/M) molar ratio to a minimal level within the effective range of Al/M ratios.

13 Claims, No Drawings

HOMOGENEOUS METALLOCENE-BASED OLEFIN POLYMERIZATION SYSTEM WITH INCREASED ACTIVITY

CROSS REFERENCE TO RELATED APPLICATIONS

This application claims benefit under 35 USC 119(e) of U.S. Provisional Application Ser. No. 60/005,598, filed Oct. 19, 1995, incorporated by reference herein.

BACKGROUND OF THE INVENTION

This invention relates to metallocene-based homogeneous olefin polymerization catalysts, and more particularly relates to an increased activity catalyst system especially suited for producing crystalline polymers of propylene.

Alpha-olefin polymerization using Ziegler-Natta catalysts is well known. Typically, the solid component of these catalysts is based on a titanium halide such as titanium tetrachloride or titanium trichloride which may be supported on a solid magnesium-containing compound. The co-catalyst component used in such heterogeneous systems typically is an aluminum alkyl such as triethylaluminum or diethylaluminum chloride. Recently, a homogeneous catalyst system has been described to polymerize alpha olefins, such as ethylene, propylene, butene, and hexene, which is based on a transition metal arene (metallocene) complex and an anion component such as derived from an aluminoxane or a boron-containing material.

Synthesis of polyolefins with metallocene/aluminoxane homogeneous catalysts is reviewed by Kaminsky in History of Polyolefins, pp.257–270, R. B. Seymour and T. Cheng (ed.), D. Reidel Publishing Co. (1986) and by Kaminsky et al in Makromol. Chem. Macromol. Symp., Vol. 3, 377–387 (1986). Metallocene/aluminoxane homogeneous catalyzed polymerization of ethylene also is reviewed by Giannetti et al in J. Poly. Sci., Vol 23, 2117–2137 (1985). Homogeneous polymerization and copolymerization of ethylene and other alpha-olefins was reported by Kaminsky and Sinn using an aluminoxane oligomer and cyclopentadienyl titanium and zirconium complexes in Proc. IUPAC Macromol. Symp. Vol. 28, 247 (1982). Copolymers of ethylene and hexene as well as low molecular weight amorphous polyhexenes have been prepared using homogeneous catalysts as reported by Kaminsky in the Proceedings of the International Symposium on Future Aspects of Olefin Polymerization (1986). This report also describes making pure isotactic polypropylene using a racemic mixture of {bis(indenyl)ethane}zirconium dichloride, while Ewen et al describe polymerization of propylene using corresponding hafnium complexes in J.Am.Chem Soc., Vol. 109, 6544–6545 (1987). Ewen describes ligand effects of metallocene/aluminoxane catalyst systems to make both atactic and isotactic polypropylene and copolymers of propylene with ethylene in Stud. Surf. Sci. & Cataly., Vol. 25, 271–292 (1986). 1-Butene was reported to be polymerized using a zircocene/methylalumoxane catalyst by Kaminsky et al in Angew. Chem. Int. Ed. Engl., Vol. 24, 507–508 (1985). All of the above-identified articles are incorporated by reference herein.

U.S. Pat. No. 4,542,199 describes use of a homogeneous catalyst system for polymerization of alpha-olefins composed of a bis(cyclopentadienyl)zirconium chloride and an aluminoxane. U.S. Pat. No. 4,544,982 describes production of normally-solid isotactic stereoblock polypropylene using a metallocene-aluminoxane catalyst. U.S. Pat. No. 4,530,914 describes polymerization of ethylene or higher alpha-olefins having a broad molecular weight distribution using a catalyst system comprising two or more metallocenes in combination with alumoxane. U.S. Pat. No. 5,324,800 describes various metallocene components, including substituted cyclopentadienyls and bridged cyclopentadienyls, in combination with aluminoxane useful in olefin polymerization. U.S. Pat. No. 4,794,096 describes a catalyst system containing an aluminoxane and a chiral stereorigid hafnium metallocene containing a structural bridge between cyclopentadienyls. The bridge includes silicon and hydrocarbon radicals. U.S. Pat. No. 4,931,417 describes a silyl or hydrocarbyl bridged metallocene component in which the metal is zirconium or hafnium and the arene is a substituted or unsubstituted cyclopentadienyl group. U.S. Pat. No. 5,241,025 describes an olefin polymerization catalyst system which is an organometallic additive compound and the reaction product of a bis(cyclopentadienyl) Group IV-B metal compound with an activator comprising a cation which irreversibly reacts with at least one ligand of the Group IV-B metal compound and a labile, bulky anion which is a single coordination complex having a plurality of lipophillic radicals or a plurality of boron atoms covalently coordinated to and shielding a central charge-bearing metal or metalloid atom. Examples of activators include substituted borane and alkyl ammonium salts of substituted borate compounds. U.S. Pat. No. 5,314,973 describes silicon-bridged metallocene compounds used as catalysts for stereoregular alpha-olefin polymerizations.

U.S. Pat. No. 5,198,401 describes metallocene-containing catalyst systems incorporating aluminium alkyls and a protic salt of a non-coordinating anion. In this reference, excess of aluminum alkyl is shown to be advantageous, in contrast to this invention in which aluminum alkyl optimally is minimized.

U.S. Pat. Nos. 5,444,134 and 5,498,582 describe metallocene-based catalyst systems supported on a carrier in which triisobutylaluminum is one of several aluminum alkyls used as co-catalysts. However, the polymerization activities reported using TIBA for such supported systems do not show the substantial activity increase as demonstrated in this invention using homogeneous catalysts.

Irrespective of the metallocene system, there is a need to increase activity of a metallocene-based olefin polymerization catalyst, to form crystalline polymers of propylene or propylene in combination with other monomers. An substantial increase in activity especially is advantageous if costly bridged metallocenes are used as a catalyst component.

SUMMARY OF THE INVENTION

An olefin homogeneous polymerization catalyst demonstrating increased activity is formed from a cyclopentadienyl metallocene component, a salt of a compatible cation and a non-coordinating anion, and a $C_3$–$C_6$ trialkylaluminum, preferably triisobutylaluminum. A homogeneous polymerization process comprises controlling polymerization activity with such catalyst by controlling the aluminum/transition metal (Al/M) molar ratio to a minimal level within the effective range of Al/M ratios.

BRIEF DESCRIPTION OF THE INVENTION

The catalyst system and process of this invention incorporate a transition metal containing metallocene component in combination with a non-coordinating borate anion and a $C_3$–$C_6$ trialkylaluminum, preferably triisobutylaluminum (TIBA). The source of the non-coordinating anion typically is a salt of the non-coordinating anion and a compatible cation which has either an active proton or its equivalent such as a Lewis acid capable of extracting an anion. An aspect of the invention is that olefin, especially propylene, homogeneous polymerization activity is increased using this catalyst system in contrast with comparable systems using other anions, such as derived from aluminoxanes or boranes, or other aluminum alkyls. Also, surprisingly, use of TIBA to increase polymerization activity is observed only in homogeneous polymerization systems and not in metallocene catalyst systems in which the metallocene component is supported on a carrier. Another aspect of this invention is that higher catalytic activity is promoted by controlling the concentration of metallocene catalyst component and anion component at minimal concentrations. This effect is unexpected based on prior studies using aluminoxanes or boranes alone which indicate that catalyst activity is increased in metallocene/aluminoxane systems by increasing component concentrations. Further, the large effect of using TIBA in homogeneous polymerization, in contrast to conventional trimethylaluminum, is unexpected and unpredictable.

The transition metal-containing component of the catalysts useful in this invention is based on transition metal arene complexes referred to as metallocenes in which typically, a Group 4b, 5b, or 6b transition metal is complexed with one or more cyclopentadienyl moieties together with one or more other ligands. In the metallocene components useful in this invention, cyclopentadiene or a substituted cyclopentadiene is complexed with a transition metal which preferably is a Group 4b metal such as titanium, zirconium or hafnium. In addition, this invention is especially beneficial for bridged metallocene compounds in which two cyclopentadiene moieties are structurally joined by a bridging group such as a hydrocarbyl or silyl radical.

Suitable metallocenes useful in this invention include those having a formula $Z_mCP_nY_{4-n}M$, wherein CP is cyclopentadienyl a substituted cyclopentadienyl; Y is a $C_1-C_{20}$ hydrocarbon radical such as alkyl, aryl, alkenyl, alkylaryl, or arylalkyl radical or a halogen; Z is a bridging group between the CP's; n is 1 or 2; and m is 0 or 1, provided that if n=1, m=0.

More particularly, suitable metallocenes of this invention include those having a formula $ZCP_2Y_1Y_2$ wherein CP is cyclopentadienyl or a substituted cyclopentadienyl, $Y_1$ and $Y_2$ may be the same or different and may be an alkyl, aryl, alkenyl, arylalkyl, or alkylaryl group or a halogen, Z is a bridging group between the CP's.

A typical bridged biscyclopentadienyl complex useful in this invention may be represented as:

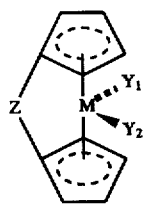

wherein $Y_1$ and $Y_2=C_1-C_{20}$ hydrocarbyl or silahydrocarbyl radicals or halogen; M=Ti, Zr, or Hf; Z=a $C_1-C_6$ hydrocarbyl, silahydrocarbyl, or silyl bridge radical; and the cyclopentadienyls may be substituted with hydrogen, halogens, or $C_1-C_{20}$ hydrocarbon or silahydrocarbyl radicals and may be multi-ring including substituted indenyl.

The bridging radical, Z, typically contains 1 to about 5 carbon or silicon atoms in the bridging chain structure, which may be substituted further with $C_1-C_6$ hydrocarbon or $C_1-C_6/Si_1-Si_3$ silahydrocarbon. Typical bridging radicals include ethylene, propylene, trimethylene, vinylene, and $SiR_2$, wherein R is a $C_1-C_8$ hydrocarbon group such as methyl, ethyl, propyl, or phenyl. Preferable bridging radicals include dimethylsilyl, diphenylsilyl, and ethylene.

The ligands, $Y_1$ and $Y_2$, attached to the transition metal include $C_1-C_{20}$ hydrocarbyl or silahydrocarbyl radicals and halogens such as chloride, fluoride, or bromide. Typical radicals are $C_1-C_{12}$ hydrocarbyl radicals including methyl, ethyl, propyl, isopropyl, butyl, isobutyl, isopentyl and the like. Preferable ligands include methyl and chloride.

The cyclopentadienyls (CP's) useful in this invention may be substituted with $C_1-C_{20}$ hydrocarbyl or silahydrocarbyl groups or halogens and may contain multi-ring systems such as indenyls. Hydrocarbyl groups include alkyl, aryl, alkenyl, arylalkyl, and alkylaryl radicals. Typical substituent groups include methyl, ethyl, propyl, isopropyl, butyl, isobutyl, isopentyl and the like. Preferable substituents include trimethylsilyl and $C_1-C_4$ lower alkyls and most preferably is methyl.

Other examples of a bridged cyclopentadienyl metallocene component useful in this invention includes structures similar to:

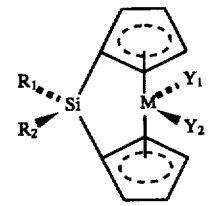

wherein $R_1$ and $R_2$ are $C_1-C_8$ hydrocarbyl groups, including alkyls and aryls; $Y_1$, $Y_2$ and M are defined as above; and the cyclopentadienyl moieties can be substituted with $C_1-C_{20}$ hydrocarbyl or silahydrocarbyl radicals, multi-ring, halogens, or hydrogen.

Specific examples of a bridged cyclopentadienyl metallocene component useful in this invention include structures similar to:

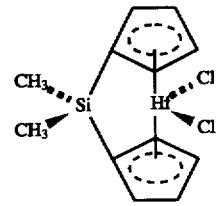

wherein the cyclopentadienyl moieties can be substituted with $C_1-C_{20}$ hydrocarbyl or silahydrocarbyl radicals, multi-ring, halogens, or hydrogen.

Specific examples of a suitable metallocene component include {bis(2,3,5-trimethylcyclopentadienyl) dimethylsilane} hafnium dichloride, {bis(2,4-dimethylcyclopentadienyl)dimethylsilane} hafnium dichloride, {bis(2-methyl-4-t-butylcyclopentadienyl) dimethylsilane} hafnium dichloride, and their respective zirconium analogues.

Other examples of suitable cyclopentadienyl complexes are bridged indenyl structures such as {bis(indenyl) ethane}zirconium dichloride:

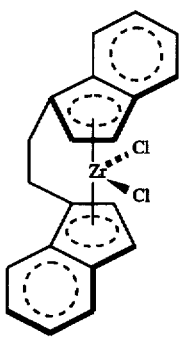

Indenyl-based metallocenes used in this invention typically may be substituted with $C_1$–$C_{20}$ hydrocarbyl or silahydrocarbyl groups, halogens, or hydrogen. Preferable substituents include aryl and $C_1$–$C_4$ lower alkyls and most preferably is methyl, ethyl, and phenyl. Examples of indenyl-based metallocenes include {bis(2-methylindenyl)dimethylsilane}zirconium dichloride and {bis(2-alkyl-4-arylindenyl)dimethylsilane}zirconium dichloride and their hafnium analogs.

The preferable metallocene component used in this invention contains a substituted single-ring Cp.

Anions especially useful in the metallocene catalyst systems of this invention are derived from salts of compatible cations and non-coordinating anions such as borates and, typically, include bulky borate anions such as anilinium salts of perfluorophenylborate. Compatible cations have either active protons or their equivalent such as a Lewis acid capable of extracting an anion. Compatible cations include triethylammonium, N,N-dimethylanilinium, and triphenylcarbenium. Suitable anions include tetra(hydrocarbyl) derivatives of boron and aluminum, such as tetraphenylborate, tetrakis{3,5-bis(trifluoromethyl)phenyl}borate, tetrakis(pentafluorophenyl)borate, and tetrakis(pentafluorophenyl)aluminate. A specific example is derived from dimethylanilinium perfluorophenylborate. Other examples of suitable species are listed on pages 6 and 7 of EP 0 277 004, incorporated by reference herein.

Triisobutylaluminum (TIBA) has been found to be most effective in promoting increased activity in metallocene/borate catalyst systems used in homogeneous polymerizations. Other possible aluminum alkyls include $C_3$–$C_6$ trialkylaluminum compounds such as tri-s-butylaluminum, tri-t-butylaluminum, tri-isopentylaluminum, isopropyldiisobutylaluminum, and the like.

Although not preferred in all applications, the TIBA/borate system of this invention may incorporate other materials such as aluminoxanes and boranes.

The amount of catalyst to be employed varies depending on choice of polymerization technique, reactor size, monomer to be polymerized, and other factors known to persons of skill in the art, and can be determined on the basis of the examples appearing hereinafter and routine experimentation. Typically the metallocene catalyst component of this invention is used in amounts ranging from about 0.0001 to 10 milligrams, preferably about 0.1 to about 0.001 milligrams, of catalyst to gram of polymer produced.

The molar ratio of non-coordinating (such as borate) anion to transition metal typically ranges from about 0.1 to about 100 and preferably ranges from about 1 to about 20.

The molar ratio of aluminum alkyl/transition metal typically ranges from about 10 to 10000, preferably ranges from about 50 to about 1000, and more preferably ranges from about 100 to about 600. Increased activity is observed if the aluminum/transition metal (Al/M) ratio is controlled to a minimal level within the effective range of Al/M ratios. The optimal ratio may be determined by routine experimentation by those skilled in the art.

Also in the process of this invention, increased activity (kg of PP/g of catalyst/hr) typically is observed if the concentration of catalyst in the polymerization medium is minimized within effective polymerization concentration ranges. Optimal concentrations also may be determined by routine experimentation known to the art.

Aluminoxanes are oligomeric aluminum/oxygen-containing compounds containing the structure:

$$\begin{array}{c} R \\ | \\ -Al-O- \end{array}$$

wherein R is a suitable alkyl or aryl substituent group.

More specifically, aluminoxanes are represented as linear or cyclic compounds with structures:

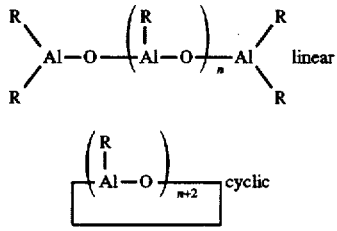

wherein R is a $C_1$–$C_5$ alkyl group and n=2 to about 20.

R is methyl or ethyl and n equals about 5 to about 15 and the most typical aluminoxane is methylaluminoxane wherein n is about 10.

Typically, mixtures of linear and cyclic aluminoxanes are prepared by reacting an aluminum trialkyl with water in a suitable organic solvent such as toluene. In one suitable method, a solution of trimethyl aluminum in toluene is reacted with the water of hydration of copper sulfate pentahydrate. Methods to prepare aluminoxanes are described in U.S. Pat. Nos. 4,542,199, 4,544,762, and 4,665,047 and by Herwig and Kaminsky in Polymer Bulletin, Vol 9, 464–469 (1983) and in J.Poly.Sci., Vol 23, 2117–2132 (1985), all incorporated by reference herein.

Typical conventional catalyst compositions have been formed by combining the transition metal metallocene compound and an aluminoxane compound with typical aluminum-to-transition metal atomic ratios of about 10 to about 10,000 and preferably about 100 to about 1000.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Typically, polymerization temperatures from about —20° to about 150° C., preferably from about 10° C. to about 120° C., are suitable from the standpoint of attaining good catalyst performance and high production rates. More preferably, polymerization according to this invention is carried out at temperatures ranging from about 20° C. to about 100° C.

Alpha-olefin polymerization or copolymerization according to this invention is carried out in a solution at reactor pressures of about atmospheric or above. Typically, reactor pressures range from about 20 to about 600 psi (140 to 4000 kPa).

The polymerization or copolymerization time will generally range from about ½ to several hours in batch processes with corresponding average residence times in continuous processes. Polymerization or copolymerization times ranging from about 1 to about 4 hours are typical in autoclave-type reactions.

Diluents suitable for use in homogeneous polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, Chloronaphthalene, ortho-dichlorobenzene, tetrahydro-naphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, or by other suitable means.

Polymerization according to this invention also may be performed using bulk monomer, such as propylene, as the diluent. In such a system, preferably, a minor amount of a solvent such as toluene is incorporated to solubilize the metallocene component in the monomer.

Irrespective of polymerization or copolymerization technique, polymerization or copolymerization is carried out under conditions that exclude oxygen, water, and other materials that act as catalyst poisons. Preferably, olefin monomers and other chemicals used in this invention should be purified of known catalyst poisons before use. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The polymerization process used in this invention is referred to as homogeneous. In homogeneous polymerization, the catalyst components, including the transition metal-containing component, initially are contained in solution in the polymerization medium. As polymerization of olefin progresses, particles of solid polymer form in the medium.

In one aspect of this invention, a solid catalytically active particle may be formed using the catalyst system described in this invention by polymerizing an olefin monomer, such as propylene, in solution using a metallocene-based catalyst system. Such particles can be recovered from a polymerizing solution without substantially affecting catalyst activity and used as a transition metal-containing catalyst component in a further polymerization which may be in bulk, slurry, or gas-phase. The co-catalyst systems and conditions used in such polymerizations may be selected from those known in the art. Typically, such catalytically active particles made according to this invention would contain polymer in a weight ratio to metallocene-containing component of about 1:1 to 1,000:1 and preferably 5:1 to 500:1.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

The invention described herein is illustrated, but not limited, by the following Examples and Comparative Runs. All procedures were performed under an inert atmosphere. Propylene polymerizations were performed at 30° C. in toluene solution under 80 psig (550 kPa) propylene pressure in "six-ounce" (175-milliliter) Fischer-Porter pressure bottles.

PROCEDURE 1

The racemic isomer of {bis(2,3,5-trimethylcyclopentadienyl) dimethylsilane} hafnium dichloride (Catalyst A), produces highly isotactic polypropylene in low yield using the methylaluminoxane (MAO) cocatalyst. An alternate cocatalyst system is desired to overcome the low activity, high cost, and high aluminum residues associated with the MAO. Preparation of Catalyst A is described in T. Mise, S. Miya, H. Yamazaki, Chem.Letters (1989), 1853–56, incorporated by reference herein.

Catalyst systems were prepared using {bis(2,3,5-trimethylcyclopentadienyl)dimethylsilane} hafnium dichloride (Catalyst A) from the metallocene component (97% racemic isomer) incorporated into toluene (distilled from sodium/benzophenone) stock solutions of dimethylanilinium perfluorophenylborate (Akzo), MAO (Sherex, 5.9% Al), modified MAO (MMAO, Akzo type 3A), tri (isobutyl)aluminum (TIBA, Albemarle), tris (perfluorophenyl)borane (Akzo, 3.15 wt % in aliphatic hydrocarbons), diethylzinc (DEZ), triethylaluminum (TEA, Aldrich, 1M in hexane), and dibutylmagnesium (DBM, FMC, 15 wt % in heptane). The metal alkyl (MAO, TIBA, TEA, DBM, MMAO, and/or DEZ) was added to a pressure bottle containing magnetic stir bar, followed by toluene and the stock solution of catalyst. After the components were allowed to react for 15 minutes, the boron containing reagent(s) was added and the bottle was closed. The final solution volume in each pressure bottle was 70 milliliters. A group of pressure bottles was removed to a constant temperature bath, stirring was begun, and gaseous propylene was introduced. The reactions were terminated by removing the bottles from the bath, excess propylene pressure was vented, and 30 vol. % isopropanol in hexane was added to deactivate the metal alkyl species. The resin samples were recovered by filtration and dried at 50° C. to constant weight under vacuum.

The effects of various cocatalyst systems on the activity of the metallocene catalyst are provided in Table 1.

TABLE 1

| Run No. | Catatyst (mg) | MAO Al/Hf | Metal (M') Alkyl | M'/Hf | Borate B/Hf | Borane B'/Hf | Activity kg PP/g cat/h |
|---|---|---|---|---|---|---|---|
| 1 | 0.30 | 500 | | | | | 0.07 |
| 2 | 0.30 | 1000 | | | | | 0.2 |
| 3 | 0.30 | 2000 | | | | | 0.31 |
| 4 | 0.30 | 5000 | | | | | 0.37 |
| 5 | 0.20 | 500 | | | 2.0 | | 18. |

TABLE 1-continued

| Run No. | Catalyst (mg) | MAO Al/Hf | Metal (M') Alkyl | M'/Hf | Borate B/Hf | Borane B'/Hf | Activity kg PP/g cat/h |
|---|---|---|---|---|---|---|---|
| 6 | 0.50 | 50 | | | 2.0 | | 20. |
| 7 | 0.50* | 50 | TIBA | 400 | 1.0 | | 26. |
| 8 | 0.50* | 0 | TIBA | 400 | 1.0 | | 45. |
| 9 | 0.20* | 0 | TIBA | 400 | 1.0 | | 77. |
| 10 | 0.50* | 0 | TIBA | 400 | 20.0 | | 66. |
| 11 | 0.20* | 0 | TIBA | 400 | 5.0 | | 128. |
| 12 | 0.20* | 0 | TIBA | 1000 | 5.0 | | 55. |
| 13 | 0.20* | 0 | TIBA | 600 | 5.0 | | 123. |
| 14 | 0.20* | 0 | TIBA | 200 | 5.0 | | 182. |
| 15 | 0.07 | 0 | TIBA | 400 | 5.0 | | 326. |
| 16 | 0.07 | 0 | TIBA | 300 | 5.0 | | 341. |
| 17 | 0.07 | 0 | TIBA | 200 | 5.0 | | 408. |
| 18 | 0.07 | 0 | TIBA | 150 | 5.0 | | 67. |
| 19 | 0.07 | 0 | TIBA | 100 | 5.0 | | 0.4 |
| 20 | 0.07 | 0 | TIBA | 50 | 5.0 | | 0.4 |
| 21 | 0.07 | 0 | TIBA | 300 | 1.0 | | 397. |
| 22 | 0.07 | 0 | TIBA | 300 | 2.0 | | 393. |
| 23 | 0.07 | 0 | TIBA | 300 | 4.0 | | 393. |
| 24 | 0.07 | 0 | TIBA | 300 | 6.0 | | 304. |
| 25 | 0.07 | 0 | TIBA | 300 | 8.0 | | 366. |
| 26 | 0.07 | 0 | TIBA | 300 | 10.0 | | 398. |
| 27 | 0.20* | 0 | MMAO | 200 | 5.0 | | 44. |
| 28 | 0.20 | 0 | TEA | 200 | 5.0 | | 3.1 |
| 29 | 0.20 | 0 | DBM | 200 | 5.0 | | 2.2 |
| 30 | 0.20 | 0 | DEZ | 200 | 5.0 | | 0.4 |
| 31 | 0.20 | 500 | | | | 5.0 | 0.38 |
| 32 | 0.07 | 0 | TIBA | 300 | | 5.0 | 0.0 |
| 33 | 0.07 | 0 | TIBA | 300 | 1.0 | 4.0 | 365. |

*Activity may be limited by excess catalyst

The following observations regarding Catalyst A were made:

Runs 1–4 illustrate that when MAO is used at large Al/Hf values between 500 and 5000, increasing the Al/Hf ratio increased polymer yield, although catalyst activity remained very low (0.1–0.4 kg PP/g cat/h).

Use of borate ($B(C_6F_5)_4$) with MAO increased catalyst activity (Run 5). The activity gain was maintained as the MAO/Hf ratio was reduced to a very low level (Run 6). Additional aluminum alkyl scavenger (TIBA) had a small positive effect on the activity achieved with the low MAO+ borate cocatalyst system, (Run 7). Substitution of the MAO with MMAO (modified methylaluminoxane) produced the highest activity observed with the MAO/borate system, 44 kg PP/g cat/h (Run 27).

Complete replacement of costly MAO cocatalyst by TIBA and borate substantially increased activity of Catalyst A. The advantageous effects of the TIBA/borate were further improved by decreasing the catalyst charge from 0.50 mg to 0.20 mg and by increasing the B/Hf ratio (Runs 8–11). Large excesses of TIBA significantly reduced the catalyst activity (Runs 11–14). Propylene polymerization activity of Catalyst A with the TIBA/borate system achieved 400 kg PP/g cat/h by further reducing the catalyst charge from 0.20 to 0.07 mg and by optimizing the TIBA/Hf ratio to between about 200 and 400 (Runs 11–20). At the lowest catalyst concentration, however, variations in the B/Hf ratio (Runs 21–26) appeared to have minimal effect on activity.

Compared to the modified MAO and TIBA, triethylaluminum, dibutylmagnesium, and diethylzinc gave low catalyst activity when used with the borate anion (Runs 28–30).

A cocatalyst system (Run 31) containing MAO and tris (perfluorophenyl)borane improved activity of Catalyst A over that using MAO alone, but the results are far below those achieved using the borate anion. Catalyst A was inactive with a TIBA/borane cocatalyst package (Run 32), although the TMH/TIBA/borate system remained highly active in the presence of the borane (Run 33).

Use of TIBA and the perfluorophenylborate anion with Catalyst A gave an extremely active polymerization catalyst system, 400 kg PP/g cat/h. Even higher polymerization activities are expected under conditions or higher temperature, higher propylene pressure, and better agitation. The activity also could be increased by lowering the level of catalyst poisons, since the large excesses of TIBA, which were found to suppress activity, could be reduced.

Total catalyst costs would be affected significantly by use of the cocatalyst described in this invention. Use of costly MAO is eliminated or significantly reduced. Further, substantial activity increases (~200 fold) using the co-catalyst system of this invention with bridged metallocene catalyst components, such as Catalyst A, offset the increased cost of using such bridged components. Since large excesses of MAO are not needed in the catalyst system of this invention, catalyst residues in the product also typically were low.

PROCEDURE 2

Polymerization procedures and reagents as described in Procedure 1 were used in the evaluation of {bis(2-methylindenyl)dimethylsilane}zirconium dichloride (Catalyst B), except that polymerizations were performed at 15° or 20° C. as indicated in Table 2. The metallocene sample was reported to be >90% racemic isomer. Catalyst B is prepared in accordance with U.S. Pat. No. 5,145,819, incorporated by reference herein.

TABLE 2

EVALUATION OF THE POLYMERIZATION ACTIVITY OF CATALYST B

| Run No. | Catalyst mg | MAO Al/Zr | TIBA Al/Zr | Borate B/Zr | Temp °C. | Activity kg PP/g cat/h |
|---|---|---|---|---|---|---|
| 34 | 0.05 | 1000 | 0 | 0 | 20 | 2. |
| 35 | 0.10 | 0 | 600 | 2.0 | 15 | 390. |
| 36 | 0.07 | 0 | 600 | 2.0 | 15 | 680. |
| 37 | 0.07* | 0 | 600 | 2.0 | 15 | 520. |
| 37A | 0.5* | 1500 | 0 | 0 | 15 | 29. |
| 38 | 0.07 | 0 | 600 | 2.0 | 20 | 410. |
| 39 | 0.05 | 0 | 600 | 2.0 | 20 | 400. |
| 40 | 0.06 | 0 | 400 | 2.0 | 20 | 310. |

*{bis(indenyl)ethane} zirconium dichloride, prepared according to W. Kaminsky, K. Kuper, H. H. Brintzinger, F. R. W. P. Wild, Angew. Chem., Int. Ed. Engl., 24 (1985), 507–8.

Propylene polymerizations carried out with Catalyst B demonstrated the following:

Use of MAO cocatalyst at 1000 Al/Zr ratio resulted in low polymerization activity, 2 kg PP/g cat/h, at 20° C. in toluene solution. The activity reported for Catalyst B for a polymerization conducted at 50° C. in bulk propylene with 3300 Al/Zr is 84 kg PP/g cat/h. (W. Spaleck, et al, Angew. Chem. Int. Ed. Engl. (1992), 31, 1347–1350.)

Replacement of the MAO cocatalyst with TIBA/borate substantially increased the activity of Catalyst B. Lowering the catalyst concentration from 0.10 to 0.07 mg improved the activity to 680 kg PP/g cat/h. The activity of {bis(indenyl)ethane}zirconium dichloride under the same conditions was 520 kg PP/g cat/h. Increasing the temperature to 20 ° C. results in a lower activity (Run 38 versus Run 36). Further reducing the catalyst charge to 0.05 mg had no effect, although reducing the Al/Zr value lowered the polymerization activity.

Qualitatively, the polymerization reactions using the highly reactive Catalyst B/TIBA/borate system experienced greater agitation problems than either those using {bis(indenyl)ethane}zirconium dichloride or Catalyst A.

PROCEDURE 3

The polymerization procedures and reagents described in Procedure 1 were used in the evaluation of {bis(cyclopentadienyl) hafnium dichloride (Catalyst C) obtained from Aldrich, except that the polymerizations were performed at temperatures indicated in Table 3. These runs demonstrate that the co-catalyst system of this invention preferably is used with bridged metallocene systems.

TABLE 3

EVALUATION OF THE POLYMERIZATION ACTIVITY OF CATALYST C

| Run No. | Catalyst mg | MAO Al/Hf | TIBA Al/Hf | Borate B/Hf | Temp. °C. | Activity kg PP/g cat/h |
|---|---|---|---|---|---|---|
| 41 | 0.50 | 0 | 2000 | 1.0 | 15 | 0.2 |
| 42 | 0.50 | 0 | 800 | 1.0 | 15 | 0.1 |
| 43 | 0.50 | 0 | 500 | 1.0 | 15 | 0.1 |
| 44 | 0.50 | 4000 | 0 | 1.0 | 15 | 6.3 |
| 45 | 0.50 | 2000 | 0 | 1.0 | 15 | 8.5 |
| 46 | 0.50 | 400 | 0 | 1.0 | 15 | 10.8 |
| 47 | 0.50 | 200 | 0 | 1.0 | 15 | 12.2 |
| 48 | 0.50 | 100 | 0 | 1.0 | 15 | 12.7 |
| 49 | 0.50 | 75 | 0 | 1.0 | 15 | 14.7 |
| 50 | 0.50 | 50 | 0 | 1.0 | 15 | 16.0 |
| 51 | 0.50 | 40 | 0 | 1.0 | 15 | 15.9 |

That which is claimed is:

1. An unsupported propylene polymerization catalyst used in homogeneous polymerization, formed from components comprising a bridged cyclopentadienyl Group 4b metallocene component, a source for a non-coordinating anion, and a trialkylaluminum, wherein the cyclopentadienyl metallocene has a structure:

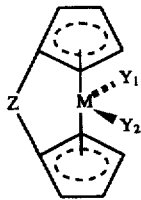

wherein $Y_1$ and $Y_2$ are $C_1-C_{20}$ hydrocarbyl or silahydrocarbyl radicals or halogen; M is Ti, Zr, or Hf; Z is a $C_1-C_6$ hydrocarbyl, silahydrocarbyl, or silyl bridge radical; and the cyclopentadienyls are substituted with at least one group selected from $C_1-C_4$ lower alkyl hydrocarbon radicals;

the trialkyl aluminum is triisobutylaluminum; and the atomic ratio of aluminum to M is between about 150 and about 1000.

2. An olefin polymerization catalyst of claim 1 formed from components wherein the non-coordinating anion is a borate anion.

3. An olefin polymerization catalyst of claim 1 wherein the bridged cyclopentadienyl is a hafnium or zirconium metallocene component, and the non-coordinating anion is a borate anion.

4. The olefin polymerization catalyst of claim 3 wherein cyclopentadienyls are substituted with at least three groups selected from $C_1-C_4$ lower alkyl hydrocarbon radicals.

5. The olefin polymerization catalyst of claim 3 wherein the non-coordinating anion is a perfluorophenylborate anion.

6. The olefin polymerization catalyst of claim 3 wherein the bridged cyclopentadienyl metallocene component is {bis(2,3,5-trimethylcyclopentadienyl)dimethylsilane} hafnium dichloride, {bis(2,4-dimethylcyclopentadienyl) dimethylsilane} hafnium dichloride, {bis(2-methyl-4-t-butylcyclopentadienyl)dimethylsilane} hafnium dichloride, {bis(2,3,5-trimethylcyclopentadienyl)dimethylsilane} zirconium dichloride, {bis(2,4-dimethylcyclopentadienyl) dimethylsilane} zirconium dichloride, or {bis(2-methyl-4-t-butylcyclopentadienyl)dimethylsilane} zirconium dichloride.

7. The olefin polymerization catalyst of claim 1 wherein the cyclopentadienyl component is indenyl.

8. A process to polymerize olefins comprising contacting an olefin under homogeneous polymerization conditions with a catalyst of claim 1.

9. The process of claim 8 wherein the olefin is propylene or a combination of propylene and copolymerizable olefins.

10. The polymerization process of claim 9 wherein the ratio of triisobutylaluminum to M is between about 200 and about 600.

11. A catalytically-active olefin polymerization catalyst particle produced by polymerizing an olefin according to claim 8 and recovering the resulting particle.

12. The catalyst particle of claim 11 wherein the olefin is propylene.

13. The catalyst particle of claim 11 wherein the weight ratio of olefin to metallocene is about 1:1 to 1000:1.

* * * * *

UNITED STATES PATENT AND TRADEMARK OFFICE
CERTIFICATE OF CORRECTION

PATENT NO. : 5,756,609
DATED : May 26, 1998
INVENTOR(S) : Steven A. Cohen

It is certified that error appears in the above-identified patent and that said Letters Patent is hereby corrected as shown below:

| Col. | Line | |
|---|---|---|
| 3 | 37 | reads "pentadienyl a substituted" should read --pentadienyl or a substituted-- |

Signed and Sealed this

Second Day of February, 1999

Attest:

Attesting Officer

Acting Commissioner of Patents and Trademarks